(12) United States Patent
Iordanis

(10) Patent No.: US 9,977,263 B2
(45) Date of Patent: May 22, 2018

(54) BLUE LIGHT FILTER LENSES

(71) Applicant: Spyridon Iordanis, Athens (GR)

(72) Inventor: Spyridon Iordanis, Athens (GR)

( * ) Notice: Subject to any disclaimer, the term of this patent is extended or adjusted under 35 U.S.C. 154(b) by 162 days.

(21) Appl. No.: 15/055,531

(22) Filed: Feb. 26, 2016

(65) Prior Publication Data

US 2016/0195736 A1  Jul. 7, 2016

(51) Int. Cl.
*G02C 7/10* (2006.01)
*G02C 5/00* (2006.01)

(52) U.S. Cl.
CPC ............. *G02C 7/104* (2013.01); *G02C 5/008* (2013.01)

(58) Field of Classification Search
CPC . G02C 5/143; G02C 7/12; G02C 1/10; G02C 2200/10; G02C 2200/16; G02C 7/04; G02C 7/049; G02C 9/04; G02C 7/02; G02C 7/022; G02C 7/10
USPC ... 351/158, 111, 41, 159.01, 159.03, 159.49, 351/159.6, 159.62, 159.63, 159.64
See application file for complete search history.

(56) References Cited

U.S. PATENT DOCUMENTS

| | | | | |
|---|---|---|---|---|
| 4,405,212 A | * | 9/1983 | Cooper | A61F 9/02 2/440 |
| 7,195,351 B2 | * | 3/2007 | Wiand | G02C 5/00 351/111 |
| 7,219,992 B1 | * | 5/2007 | Wu | G02C 1/06 351/83 |

* cited by examiner

*Primary Examiner* — Hung Dang
(74) *Attorney, Agent, or Firm* — George C. Pappas

(57) ABSTRACT

The disclosure relates to ophthalmic lenses consisting of a front surface coating section made of a multi-layer structure that reflects digital blue light, a lens section, and a rear surface coating section made of a multi-layer structure that absorbs digital blue light while allowing higher energy blue light to pass through. The lens equalizes the light energy differences of the light exiting from the rear surface of the lens, offering a hi level of contrast perception and sharpness. The ophthalmic lenses employ photonic crystal thin films made from fully transparent nanostructures. The lenses fully block UV light while at the same time efficiently filtering blue light emitted from digital devices and monitors.

20 Claims, 8 Drawing Sheets

BLUE LIGHT FILTER LENSES

FIELD

The present disclosure relates to improved lenses and associated eyewear for filtering blue light.

BACKGROUND

Computer monitors are responsible for eye strain and vision problems. According to American Optometric Association, extensive use (more than 3-4 hours) of computer monitors, smartphones and tablets etc., is one of the main reasons for experiencing eye fatigue, blurred vision, dry eyes, and headaches. A person's optical system is designed to act as a natural filter protecting the eyes from undesirable or harmful rays. Although this human optical system provides significant protection against blue light rays coming from the sun, it is not biologically evolved to confront the blue light emanating from digital devices, or fluorescent-light tubes and LED lightning. Natural blue light is part of the visible light spectrum and it's considered to be beneficial, since it helps to regulate our body's biological clock, to trigger our body's growth mechanism and it plays an important role for people to feel euphoria. In other words blue light triggers our happiness feeling. As a part of visible light spectrum, natural blue light ought to not be totally blocked, as it would affect the quality of our vision by affecting color perception, it would disturb our growth mechanism and our body's internal clock. Nevertheless, LCD and LED computers monitors, TV's and smartphone devices emitting a different type of blue-violet light, which can have harmful impact on eyes and specifically on the retina.

Blue light- or high energy visible light- is emitted by the sun and can be beneficial to our growth as they help to regulate our bodies' internal clock by triggering the production of melatonin. Blue Light triggers the creation of Melatonin, a very important hormone that tells the body when it should sleep. However, over exposure to blue light, especially at the wrong times, can cause insomnia and sleep circle disruption. Additionally experts consider some types of blue light as the main factor for age-related macular degeneration, which affects the part of the retina responsible for our sharp central vision. Prolonged exposure to blue light may cause retinal damage and contribute to age-related macular degeneration, which can lead to loss of vision.

Ultraviolet (UV) radiation is around us, every day of our life, even on a cloudy day. UVB radiation links to the range of 280 nm to 320 nm, while UVA links to 320 to 380 nm in wavelength. We all know that UV radiation can affect our skin by increasing the risk of skin cancers, but excessive exposure to UV without wearing optical lenses and sunglasses can damage our eyes and could lead to early cataract, or temporary blindness caused by cornea sunburn. It's important to protect our eyes against UV even when we are indoors since sunlight can travel through windows.

It is estimated that on average, nine in ten adults spend more than two hours each day staring at a digital device, with more than six in 10 adults spending five or more hours on digital devices each day. All that time takes a toll on the eyes and lead to Digital Eye Strain.

Digital Eye Strain (D.E.S.) syndrome is the physical discomfort felt after two or more hours of work in front of digital monitors and it is associated with their artificial blue light emissions combined with the constant focus at close to mid-range distance. Electronic device monitors are emitting harmful artificial blue light, which in time harms the quality of tears layers and contributes to early occurrence of certain eye damages and syndromes (e.g. early cataracts and macular degeneration). Furthermore, spending significant amounts of time in front of a monitor causes blink rates to reduce, resulting to dry, itchy or burning eyes.

Bright lighting and too much glare can also strain your eyes, resulting to irregularities in contrast perception, which makes working on your monitor demanding. The worst contrast perception problems are generally from sources above or behind you, including fluorescent lighting and sunlight.

Examples of D.E.S. syndrome symptoms include headaches from repeated eye strains, blurred double vision or dizziness, dry eyes due to reduced blinking rate, eyelid aches during blinking due to blue light effect on tear layer quality, increased sensitivity to light, blurred vision due to screen glare, as well as general fatigue from staring at screens and straining to see small fonts and images.

Driving related eye strain is also common. When driving, one's eyes are constantly in motion, focusing and refocusing as objects approach, and contending with distractions, such as oncoming headlights or straining to see in very dim light. Under such conditions, the eyes become strained (Driving Eye Strain Syndrome), to the point where safety and visual effectiveness while driving can be severely impacted. Classical symptoms of driving eye strain include sore or itching eyes, watery or dry eyes, blurred vision, increased sensitivity to light, difficulty concentrating on the road, and difficulty keeping one's eyes open.

Digital eyestrain does not just affect adults. Children are also at risk for eyestrain due to the growing use of digital devices. Children today have more digital gear at their disposal than ever before—tablets, smart phones; videogames are just among a few. By some accounts, children and teenagers (ages 8-18) spend more than seven (7) hours a day consuming electronic media.

Before age ten (10), children's eyes are not fully developed. In an undeveloped eye, the crystalline lens and cornea are still largely transparent and overexposed to light. Too much exposure to blue light is particularly dangerous in kids for this reason, and parents have been advised to supervise and limit the amount of screen time exposure by kids.

Dark room type exposure to blue light—mainly from computers, smart phones and tablets in unlit (or poorly unlit) surroundings—is particularly harmful. While blue light normally triggers the creation of melatonin—an important and useful hormone that tells the body when it should sleep—over exposure to blue light, especially at the wrong times, can cause insomnia and sleep cycle disruption.

The use of blue-light filters on eyewear has proven useful in protecting eyes against harmful radiation. It is extremely desirable to be able to provide lenses with digital blue light filtering capability together with excellent contrast and sharpness performance to achieve a pleasant viewing experience.

SUMMARY

The present disclosure relates to ophthalmic lenses consisting of a front surface coating section made of a multi-layer structure that reflects digital blue light, a lens section, and a rear surface coating section made of a multi-layer structure that absorbs 66% of the digital blue light in the spectrum of 444 nm to 455 nm, while allowing desirable natural blue light to pass through.

The ophthalmic lenses employ photonic crystal thin films made from fully transparent nanostructures. The lenses fully block UV light while at the same time efficiently filtering blue light emitted from digital devices and monitors.

These and other features and advantages of the present invention will be apparent from the description of exemplary embodiments provided herein.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

DETAILED DESCRIPTION

Figure 1:
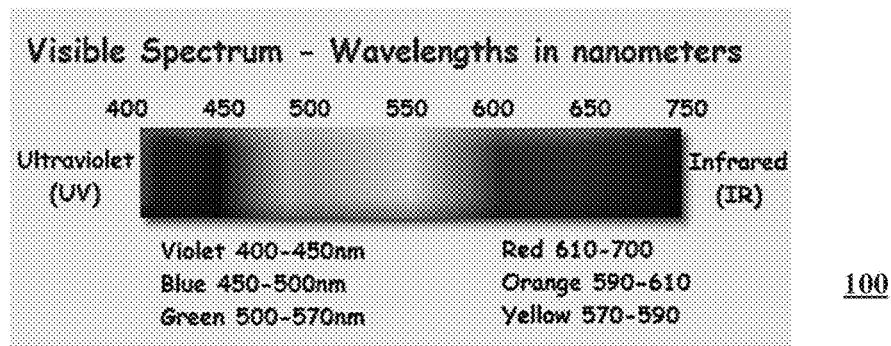
FIG. 1 is a graph showing the visible spectrum wavelength range.

The word "exemplary" is used herein to mean "serving as an example, instance, or illustration." Any embodiment described herein as "exemplary" is not necessarily to be construed as preferred or advantageous over other embodiments.

The following description is intended to convey a thorough understanding of the embodiments described by providing a number of specific embodiments and details involving methods and systems for managing content submission and publication of content. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

In accordance with an exemplary embodiment, an improved ophthalmic lens technology actively and selectively filters blue light radiation emitted by digital device monitors while at same time provides critical blocking of ultraviolet A (UVA) and ultraviolet B (UVB) radiation.

It is well known to construct ophthalmic lens materials designed to reflect, absorb and transmit light of certain frequencies. A proposed approach, described in more detail below, aims to provide an ophthalmic lens that actively controls the range of the transmitted light radiation by reflecting 100% of UVA and UVB radiation, while more efficiently reducing blue light radiation. The proposed approach addresses problems associated with Digital Eye Strain and Driving Eye Strain syndromes. More specifically, the proposed ophthalmic lens technology reduces transmission of blue light in the spectrum of 380-455 nm, while allowing higher wavelength rays, e.g., above 470 nm, to pass so as to allow for a true color vision experience and normal rate of melatonin production.

In this regard, the ophthalmic lenses function as a blue light guard medium. The proposed blue light guard medium comprises three sections for filtering and radiation blocking, each section providing a distinct stage of blue light processing unique in terms of the variance of absorption (A), reflection (R) and/or transmittance (T) that occurs within (or at) each section or section boundary.

The first section (the "front surface coating section"), digital blue light transmission is passively reflected by as much as 45% in comparison to total natural blue light radiation, which is largely unaffected. The front surface coating section therefore mainly provides blue light reflection. The corresponding stage of light processing is characteristically and temporally coined the "blue light reflection stage". Light, including but particularly blue light, that is not reflected by the front surface coating section will eventually move to the second section. This is the "lens section".

The lens section most typically is a conventional UV420 type lens designed and constructed to reflect harmful UV rays. The shape and carving of the lens is designed to provide the desired prescription in the case of prescription spectacles. The corresponding stage of light processing name UV Protection Stage) provides minimal blue light blocking (reflection predominantly) except for incident blue light in the range of 380 to 420 nm range (just beyond UV rays), that were not reflected (and thus allowed to pass) by the front coating section.

Blue light, and particularly harmful blue light, that has managed to get through both the front surface coating section and the lens section is then designed to travel toward the direction of the final physical section, this being the "rear surface coating section".

The rear surface coating section is designed and constructed mainly to absorb a significant amount of harmful blue light that's made it past the blue light reflecting stage and the UV reflection stage as it traveled through the front surface coating section and the lens section before then entering or striking the rear surface coating section.

The unique design aspect of the rear surface coating section is that layer coatings are selected that allow most of the good blue light to travel (un-reflected and unabsorbed).

The light that passes through all three sections and corresponding stages of processing—in the case of a three-section ophthalmic lens use—exits the outermost surface of the rear surface coating section to eventually find its way onto the corresponding eye of the spectacle wearer. This third, or last, stage of processing we refer to as the Blue light active absorption stage.

In one scenario, harmful blue light that does not get absorbed is alternatively, at least partially, reflected by the rear surface coating section due to the presence of an additional layer (comprised as part of the rear surface coating section) to provide blue light reflecting capabilities similar to the materials (layers) in the front surface coating section.

A three-section blue light filtering ophthalmic lens, as proposed, has been successfully tested using different methodologies and proven to provide superior blue light filtering efficiency without compromising lens construction durability, optical (prescription) performance, superb contrast and/or sharpness.

In (or during) the Blue light active absorption stage, our blue light guard medium (the rear surface coating section) was found to absorb an additional 30% of digital device blue light emissions to further protect the exposed eye from this harmful blue digital light.

Simultaneously, a relatively high transmittance of 55-75% is provided by the blue guard medium in response to natural blue light. However, in terms of blue light filtering, when blue light strikes the lens of the type emitted by digital devices, a chemical reaction is triggered (as shall be explained below) which reduces blue light transmittance to 35-45% for wavelengths between 430 and 460 nm.

For better understanding of the invention, reference is drawn to the figures.

FIG. 1 is a graph 100 showing the visible spectrum wavelength range.

Figure 2:
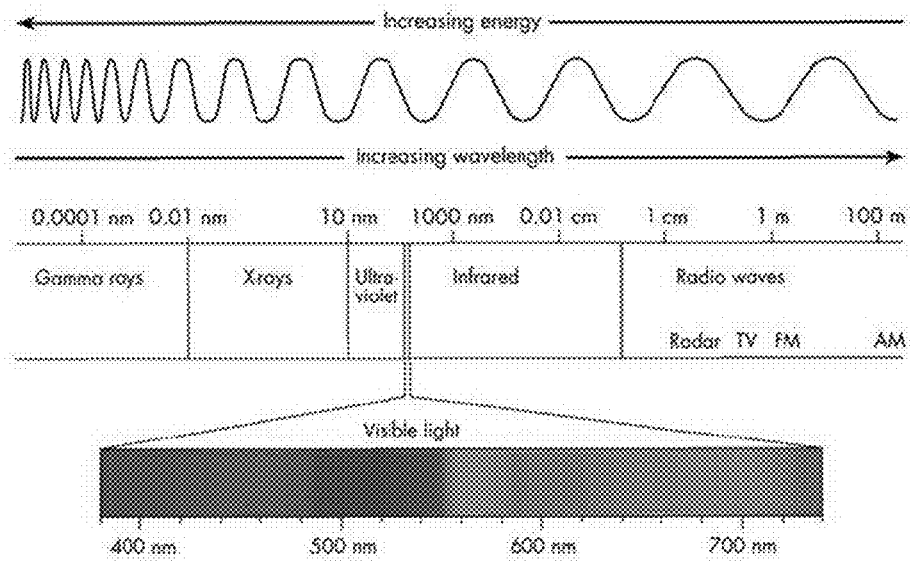
FIG. 2 is a graph showing visible light range in relation to broader spectrum range and the relation of low and high energy levels across this broader spectrum.

FIG. 2 is a graph 200 showing visible light range in relation to broader spectrum range and the relation of low and high energy levels across this broader spectrum.

Visible light to humans ranges over a light spectrum extending from 380 nm to 780 nm of wavelength. Light waves also come in many frequencies. Frequency is the number of waves that pass a point in space during any time interval, usually one second. The frequency of visible light is referred to as color, and ranges from 430 trillion hertz, seen as red, to 750 trillion hertz, and seen as violet. Again, the full range of frequencies extends beyond the visible portion, from less than 3 billion hertz, as in radio waves, to greater than 3 billion hertz ($3 \times 10^{19}$), as in gamma rays. Light waves consist of a continuous range of wavelengths or frequencies. The amount of energy in light wave is proportionally related to its frequency: High frequency light has high energy; low frequency light has low energy. So, in visible light, blue light has the most energy and red the least.

Light contains an infinite number of "tiny lumps", called photons. When photons strike a lens surface, they act like billiard balls, transferring their energy to electrons of the lens material, which become dislodged from their "parent" atoms. Once freed, these electrons move along the lens material or get ejected from the surface. It is useful to think of the lens electrons as being attached to their atoms by springs. The electrons and their attached springs have a tendency to vibrate at specific frequencies. When the electrons are held tightly, and they pass the vibrations along to the nuclei of the lens atoms the energy is being absorbed. Reflection and transmission of light waves occur because the frequencies of the light waves do not match the natural frequencies of vibration of the lens. When light encounters an ophthalmic lens, it could: a) absorbed, in which case its energy is converted to heat, b) reflected by the lens to the environment, or c) transmitted through the lens to the next media, which is our eye.

Figure 3:
FIG. 3 shows a single pair of spectacles including framed prescription ophthalmic lenses constructed in accordance with an exemplary embodiment.

FIG. 3 shows a single pair of spectacles 300 including framed prescription ophthalmic lenses constructed in accordance with an exemplary embodiment. In an alternate embodiment, the ophthalmic lens technology proposed herein may be employed to construct sunglass type ophthalmic lenses.

Figure 4:
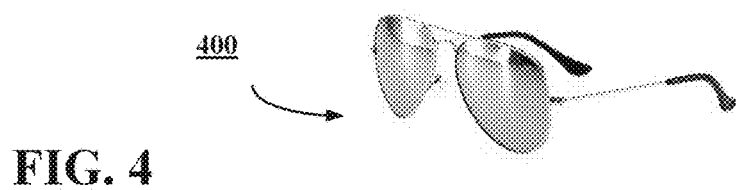
FIG. 4 shows a single pair of spectacles including framed sunglass type ophthalmic lenses constructed in accordance with a further exemplary embodiment.

FIG. 4 shows a single pair of spectacles 400 including framed sunglass type ophthalmic lenses constructed in accordance with a further exemplary embodiment.

The proposed ophthalmic lenses are designed such that most of the beneficial blue light reaches the eye when the lenses are worn outdoors where there is minimal bad blue light and maximum good blue light. More importantly, however, the same lenses are exposed to high amounts of bad blue light—such as when the same lenses are worn indoors exposing the eyes to radiation from monitors and other digital devices, and particularly in a dark environment—the same ophthalmic lenses filter as much as 66% of bad blue light radiation.

Figure 5:
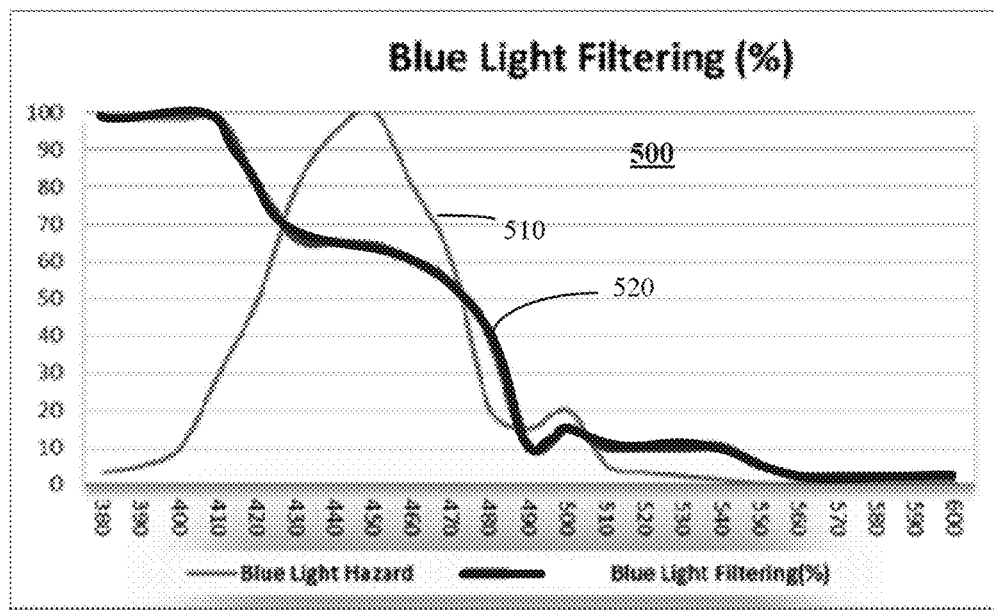
FIG. 5 graphically maps blue light hazard curve against the blue light filtering properties curve of an ophthalmic lens constructed in accordance with an exemplary embodiment across the harmful portion of UV and the neighboring visible light spectrum.

FIG. 5 is a graphic 500 that maps blue hazard curve line 510 against the blue light filtering line 520 properties curve of an ophthalmic lens constructed in accordance with an exemplary embodiment across the harmful portion of UV and the neighboring visible light spectrum. The blue hazard line 510 is a theoretical, industry accepted curve showing the ranges of blue light considered hazardous and to what extent. The blue light filtering curve 520 are the measured blue light filtering capabilities of the proposed construction ophthalmic lenses. By overlapping the two lines together one can see how efficient the blue light filtering is across the most hazardous blue light spectrum.

Figure 6:
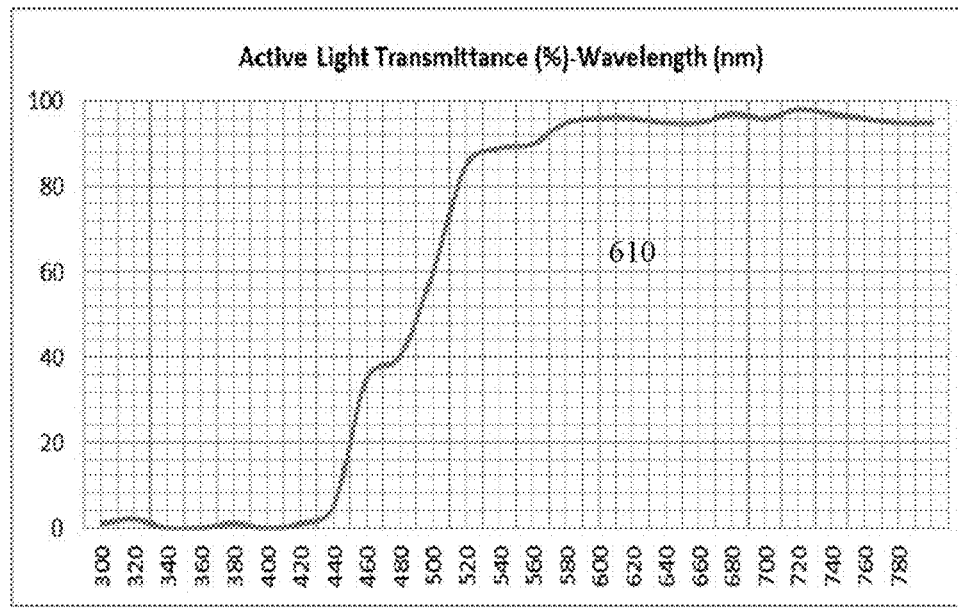
FIG. 6 is a graph of a percent active light transmittance curve across the harmful portion of UV and neighboring visible light spectrum for an ophthalmic lens constructed in accordance with an exemplary embodiment provided as a result of introducing blue light absorption.

FIG. 6 is a graph 600 of a percent active light transmittance curve 610 across the harmful portion of UV and neighboring visible light spectrum for an ophthalmic lens constructed in accordance with an exemplary embodiment provided as a result of introducing blue light absorption. As can be seen, while a desirable amount of hazardous blue light is "actively" absorbed by the rear surface coating section, the good blue light, as well as higher frequency natural light is allowed to pass.

Figure 7:
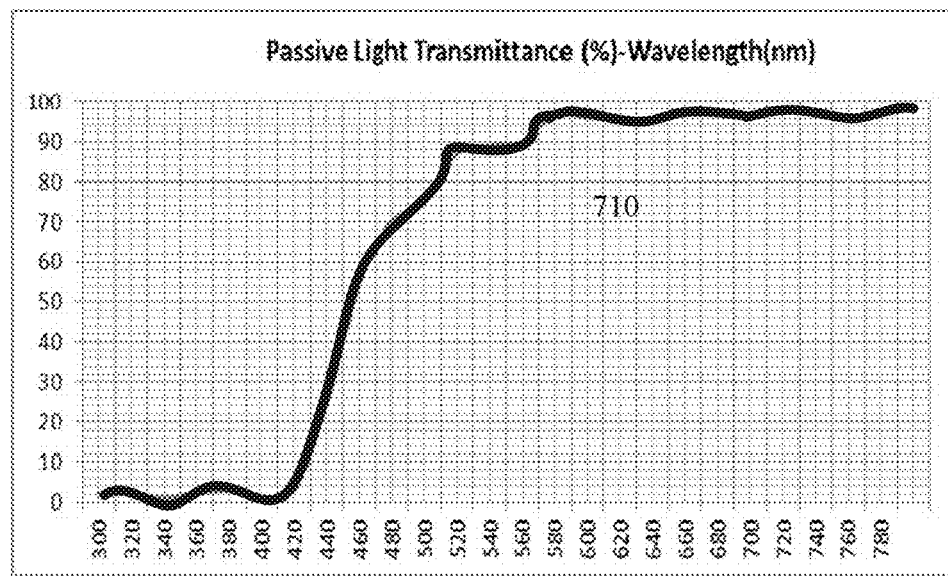
FIG. 7 is a graph of a percent passive light transmittance curve across the harmful portion of UV and neighboring visible light spectrum for an ophthalmic lens constructed in accordance with an exemplary embodiment as a result of providing blue light reflectance.

FIG. 7 is a graph 700 of a percent passive light transmittance curve 710 across the harmful portion of UV and neighboring visible light spectrum for an ophthalmic lens constructed in accordance with an exemplary embodiment as a result of providing blue light reflectance. Here we see that, largely due respect to the front surface coating section, which is passively reflecting hazardous blue light, good light transmittance is very good.

Figure 8:
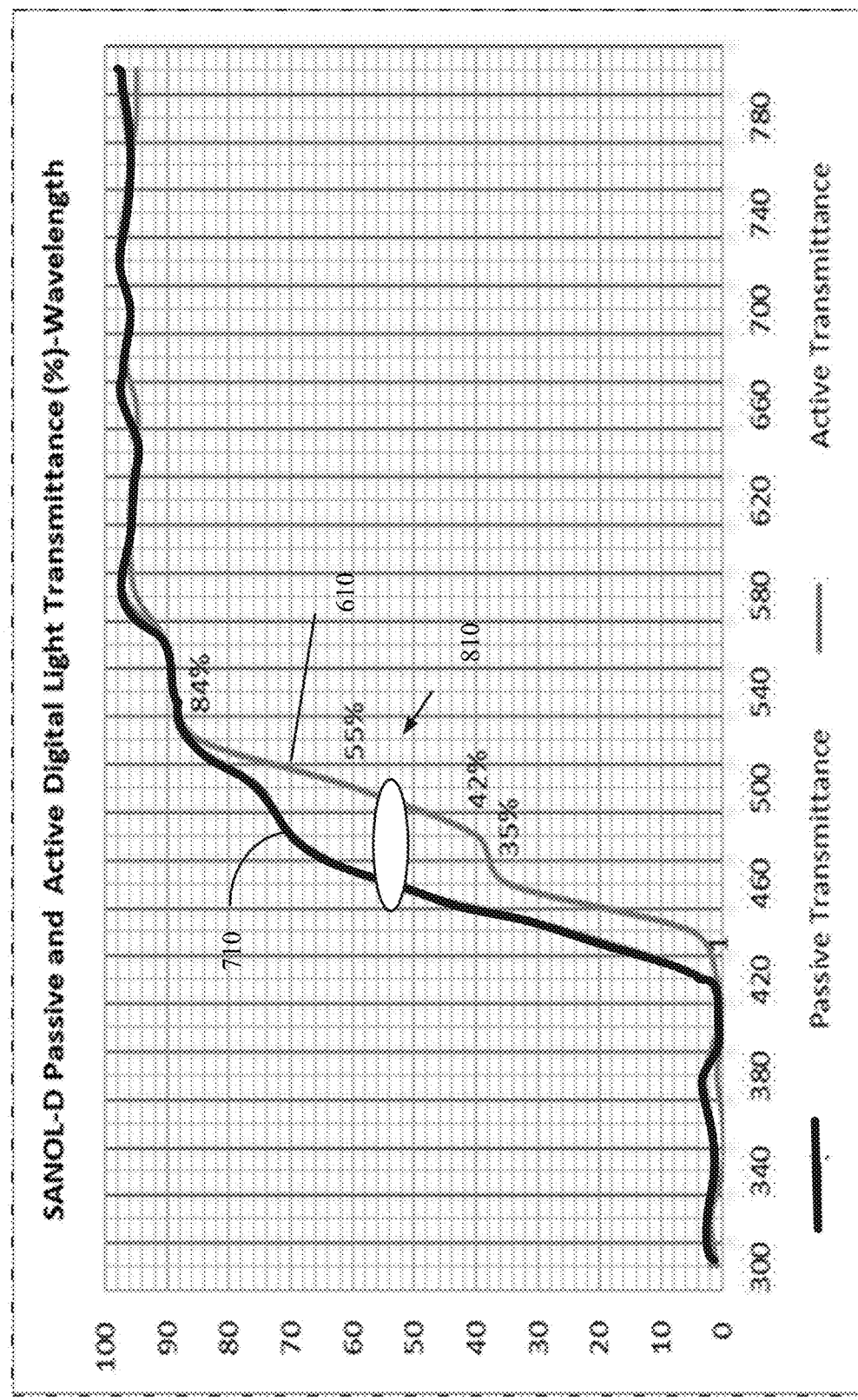
FIG. 8 is a graph overlaying the curves of FIGS. 6 and 7 to show the total percent active and light transmittance (and the incident decrease of blue light transmittance) across the relevant UV and visible light range.

FIG. 8 is a graph 800 overlaying the curves 610, 710 of FIGS. 6 and 7 to show the total percent active and light transmittance (and the incident decrease of blue light transmittance) across the relevant UV and visible light range. The region marked with an oval 810 illustrates that for wavelengths between 420 and approx. 500 nm. the two curves do not coincide. This means that depending on one's environment (i.e., dark room with high digital blue light or outdoors with a fair amount of natural and good blue light but low bad blue light), the proposed ophthalmic lenses are designed to respond differently to blue light so as to achieve an optimal viewing experience.

Because digital blue light (in the range of 420-450 nm) is blocked by the presently constructed blue light guard medium, sensitive areas of a retina are allowed to operate undistracted, thus allowing increased contrast perception sensation.

In addition, D.E.S. syndrome symptoms are minimized. Also, because beneficial blue light is largely unfiltered, symptoms related to sleep disruption and biological clock disturbance are minimized.

The proposed blue light guard medium technology has been shown to be compatible with lenses for all prescriptions.

Figure 9:
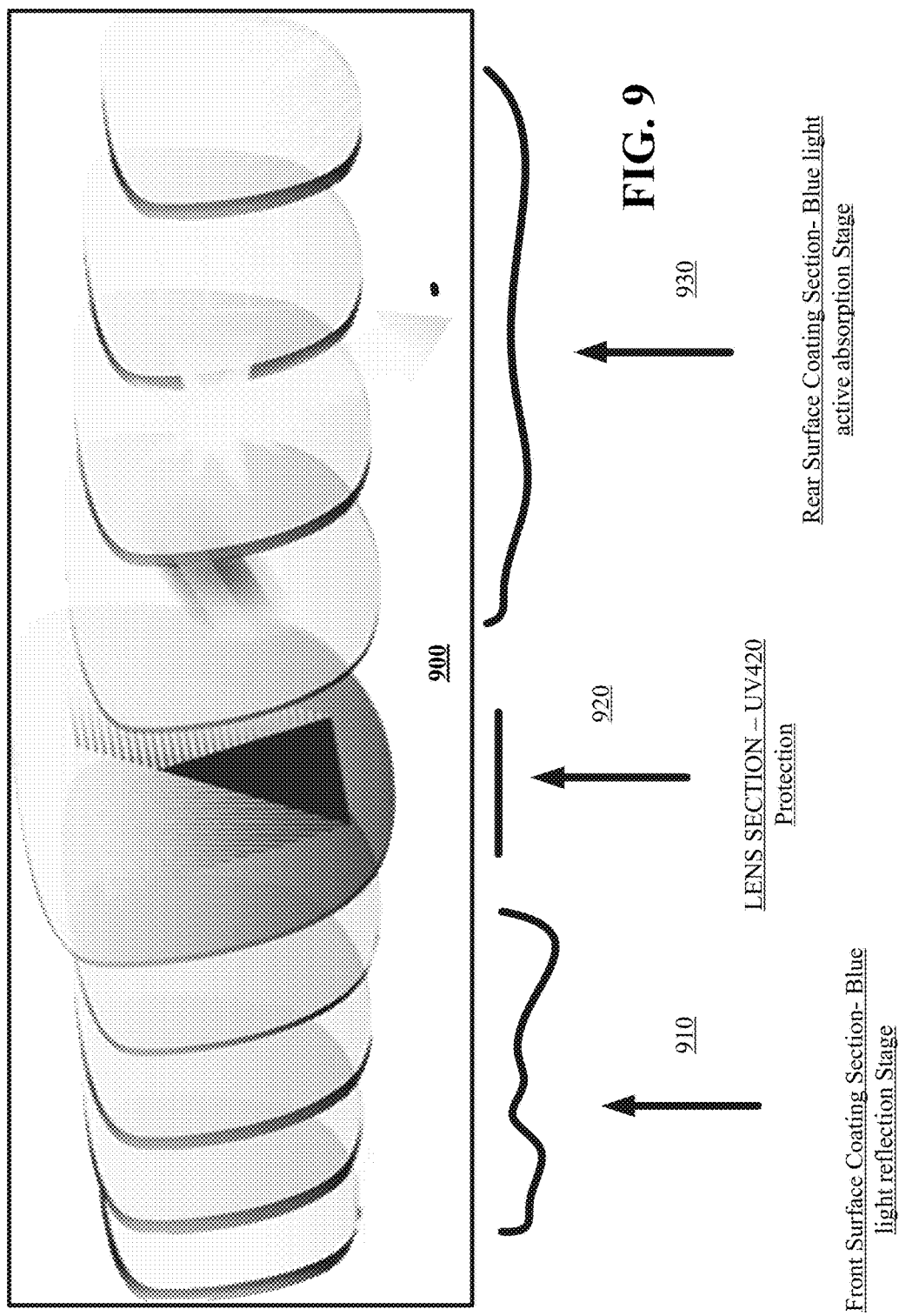
FIG. 9 is an example blow up view of the sections and layers of an ophthalmic lens constructed in accordance with an exemplary embodiment.

FIG. 9 is an example blow up view 900 of the sections and layers of an ophthalmic lens constructed in accordance with an exemplary embodiment. As previously explained, the proposed ophthalmic lens, may be logically constructed into three distinct sections: (i) front surface coating section 910; (ii) lens section 920; and (iii) rear coating section 930. Each section consists of multiple layers deposited (formed) over one another using known techniques designed to achieve a desired amount of reflectivity and/or transmittance over the visible light spectrum, as well as the appropriate UV protection.

While the notion of blue light absorption is known and has been used in the past for other applications, the introduction of bad blue light absorbing material in the rear surface coating section of an ophthalmic lens has never been proposed. In addition, the combination of front surface coating section made of layers designed to eliminate a substantial amount of initial bad blue light using blue light reflecting material, with residuals amounts absorbed via the rear surface coating section, which does the absorbing, has also never been proposed.

A natural byproduct of absorption is the generation of heat. For this purpose, it is further proposed to use heat absorbing frame material in combination with our lenses to transfer heat away from the lenses and dissipate it effectively.

Figure 10:
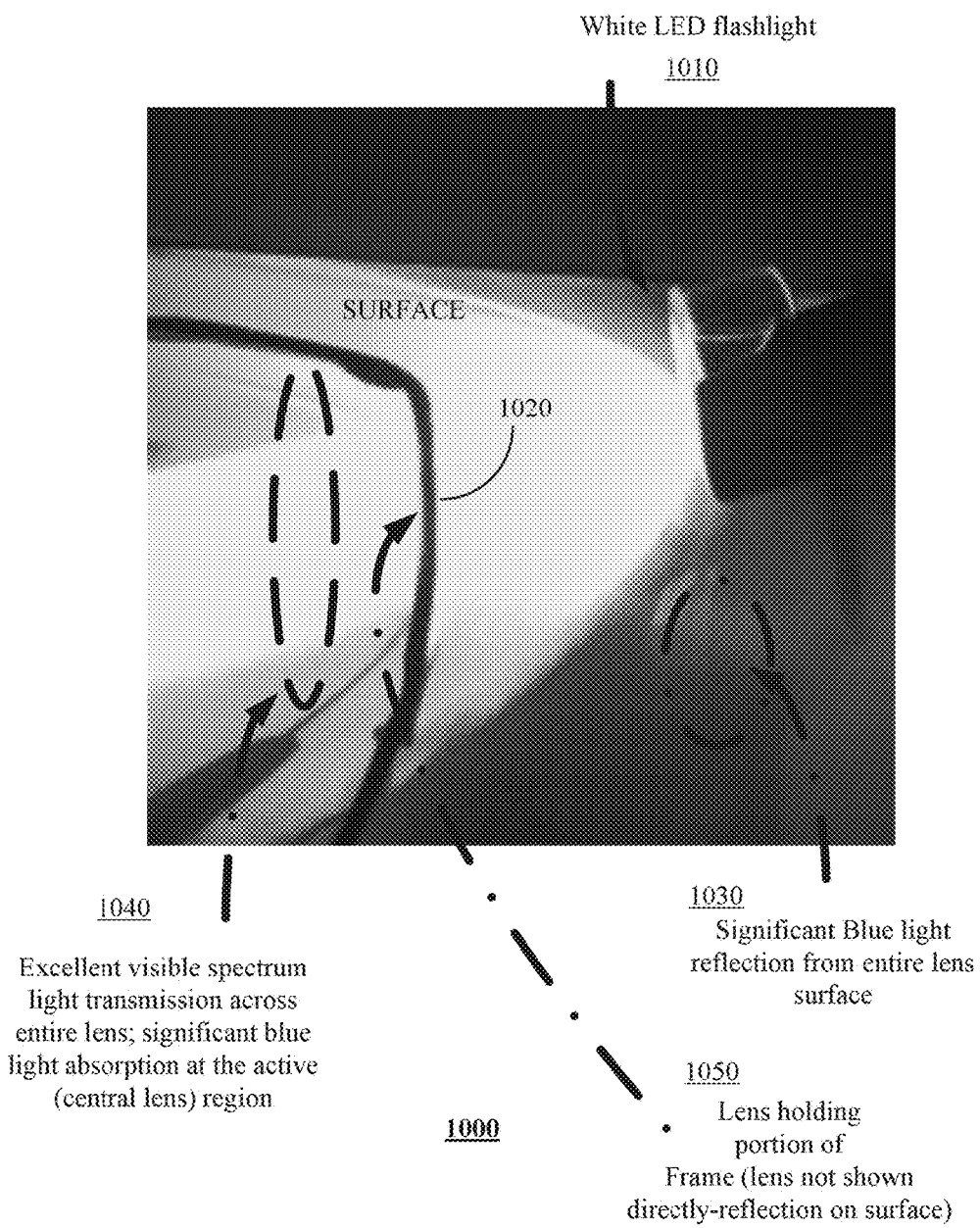
FIGS. 10-12 are photos of each of three tests generated in response to shining a high energy white light through a set of ophthalmic lenses constructed as proposed with the lenses and incident light being orientated in three different positions respectively.
Figure 11:
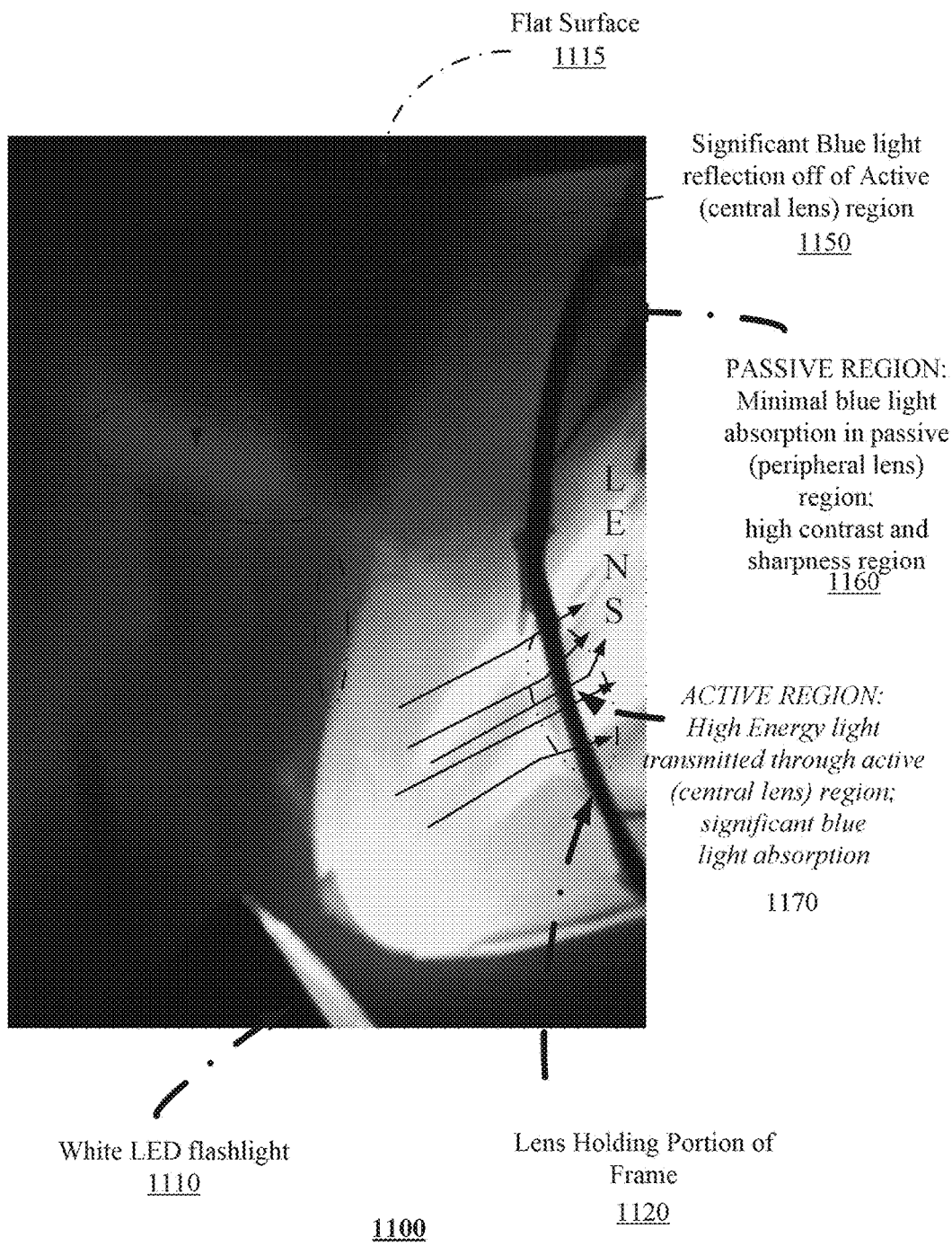
Figure 12:
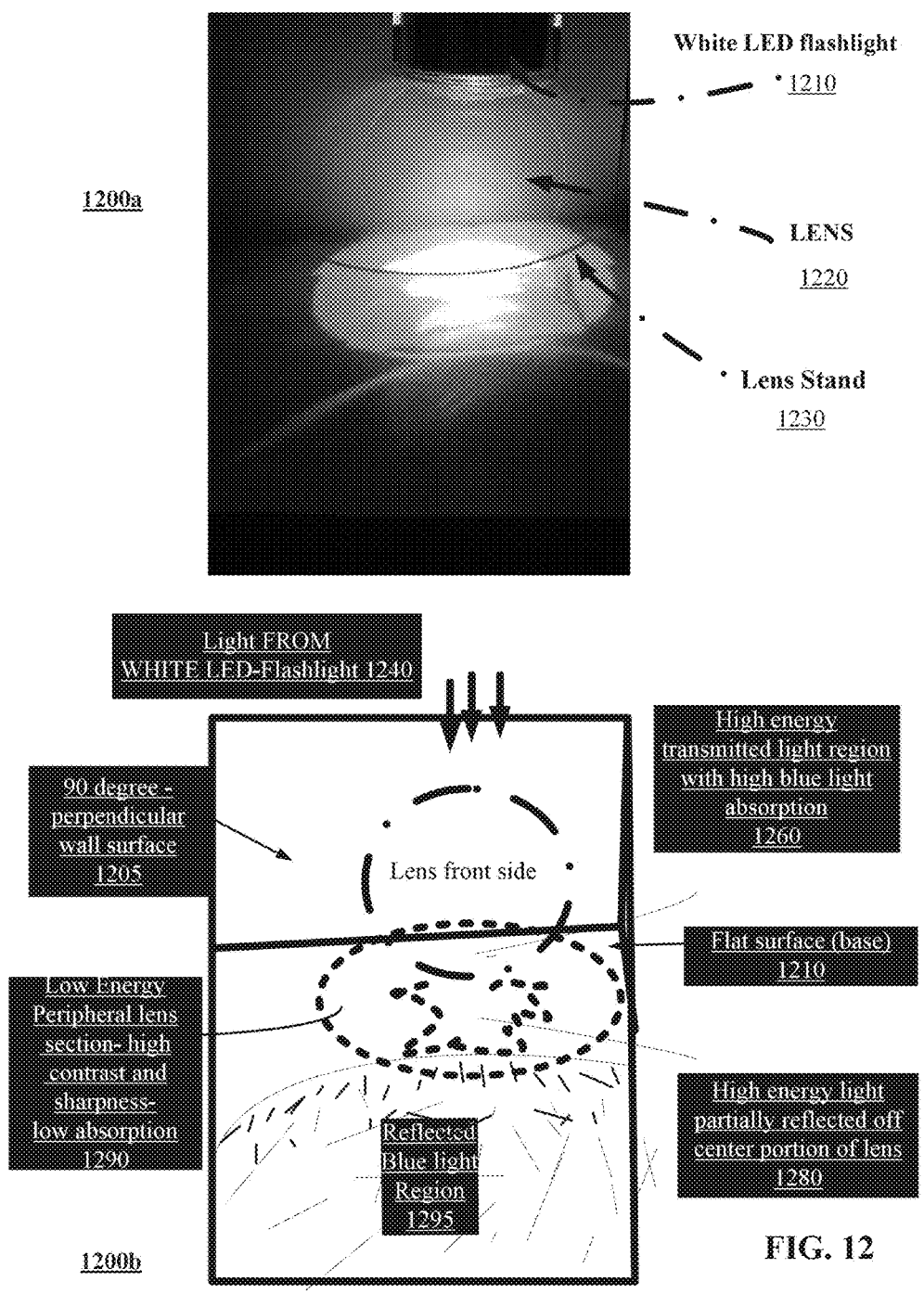

FIGS. 10-12 are photos 1000, 1100, 1200 of each of three tests generated in response to shining a high energy white light through a set of ophthalmic lenses constructed as proposed with the lenses and incident light being orientated in three different positions respectively.

Referring to FIG. 10, photo 1000 shows what happens during a test where a bright white light from a flashlight (1010) is shone through framed lens 1020, where a framed lens propped by the frame itself against a white board in a dark room environment. At 1030, we see a region with significant blue light reflection coming from the entire lens surface. At 1040, we see excellent visible spectrum light transmission across entire lens, as well as significant blue light absorption at the active (central lens) region. Arrow 1050 points to a shadow line evidencing the presence of a lens being held by the frame.

Referring to FIG. 11, photo 1100 is a test showing what happens when a bright light from a flashlight 1110, again in a dark room environment so it is easy to discern, is shone against a flat (white board) surface 1115, this time with the light shone at a different (60°) angle than that of FIG. 10. First, we see significant Blue light reflection off of the lens central region (1150). We call this the active region because this is also the area where the absorbing material is concentrated as explained below in greater detail.

In the peripheral area 1160 outside and around the central region we see minimal blue light absorption, as is desired. We also detected excellent (high) contrast and sharpness. In the separate area 1170, and most importantly, we find that high energy light is transmitted nicely across the active (central lens) region, and a lack of bad blue light transmittance, establishing that there is very good bad blue light absorption.

Referring to FIG. 12, we have a photo view 1200a accompanied by a diagrammatic view 1200b showing the light regions exhibited during a similar flashlight (1210) test as above except a non-framed lens (1220) is used propped up partially against a perpendicular white board surface 1205 on one end, and a flat white board surface 1210 on the other, and supported in place at the flat surface end by a makeshift lens stand (1230).

Referring to the diagrammatic view 1200b, arrows 1240 represent the bright white light from the flashlight. Region 1260 shows high energy transmitted light region with high digital blue light absorption. Region 1280 is an area where high energy light is partially reflected off center portion of lens. Region 1290 is an area with low energy digital blue light reflection, high contrast and sharpness, and low blue light absorption of any kind.

Passive Blue Light and UV Filtering_First and Second Stage Filtering

When UV radiation passes through the proposed blue light guard lens medium, electrons in the atoms of the lens material begin to vibrate. Instead of vibrating at large amplitude to allow UV go through, the electrons vibrate for brief periods of time with small amplitudes of vibration. As a result UV radiation is fully remitted as reflected light wave. Blue light with a frequency of 420-495 nm has shorter vibrations than that of the lens electrons, and is passed on to neighboring atoms through the bulk of the material and it transmits through the lens.

The proposed blue light guard medium inherently has a special blue tint coat on a front surface (surface opposite the eyewearer's face) of the lens which front surface acts as a filter to permanently reduce blue light propagation by 35-45% of incident light onto the lens. Blue light transmittance is reduced by up to 65% for radiation between 420 and 455 nm, and up to 70% for wavelengths between 460 to 470 nm, thus allowing most beneficial natural blue light to pass through to the next stage, in those cases where the lenses are worn outdoors under strong sunlight.

As we saw in the photo of FIG. 8, digital blue Light is well reflected by the proposed lens. White light emitted by a digital source (flashlight in our example) is reflected by the lens as blue light on a white board.

Likewise in FIG. 10, we saw white light emitted by a digital source aimed at a lens at an angle. Because the LED light is mostly targeted to the center of the lens, the central areas of the lens react to the light and reflect more light than the periphery of the lens which reflects less light. In color mode we would be able to more clearly discern that digital blue light is separated from the reflection and appears outside the lens reflection circle. This helps with contrast correction on a lens, since digital blue light is reflected away from the lens.

Active Blue Light Filtering_Third Stage Filtering

The proposed multi-stage construction blue light guard ophthalmic lens material is at least partially designed using "active" nanotechnology ophthalmic lens technology. Taking into account that many forms of blue light are beneficial to humans, a new type of antireflection lens coating is proposed. This proposed coating consists of photonic crystals of a type designed to allow a controlled propagation of blue light through a lens. In one scenario, the proposed photonic crystal material consistsof three distinct layers constructed from transparent Titanium Dioxide, Magnesium Fluoride and Iridium Sulphide respectively. During fabrication, repeating regions of high and low dielectric constants of photonic crystals are created between what are otherwise traditionally formed layers of anti-reflective (AR) coatings formed at or near the rear surface of a lens (i.e., the lens surface closest to the eye wearer's face). It has been found that by strategically positioning photonic crystals in specific angle orientation as proposed, it is possible to achieve an additional 30% of blue light filtering due to absorption in the presence of digital light.

The photonic crystal material is formed into multiple layers of thin films. The angle and order of the thin films are selectively arranged to achieve the maximum possible (or desirable) blue light filtering of the type emitted from digital devices. The manner in which to achieve such optimal filtering by selective placement of photonic crystal material is generally well known and would not require undue experimentation.

As previously explained, the thin film photonic crystal layers are designed to chemically react (i.e., rearrange molecular alignment of corresponding think film layer material) when the blue light emitted by digital devices strikes the layers causing electrons which have similar vibrational frequencies as that of blue light electrons to become activated. When activated by the frequency of digital blue light, the molecules of the thin films become rearranged to form new patterns with widths ranging from 70-85 mm, 165 nm-185 nm, and 195-210 nm. The energy of the digital blue light is absorbed by the thin film crystal layers and contributes to the molecular arrangement transformation. Excess energy is converted to heat.

In an alternate embodiment, it is proposed to use the presently proposed ophthalmic lenses with frames made of a heat dissipating material to facilitate the process and also to prevent the frames and/or lenses from becoming warm when worn. Any known plastic or similar nature compound material with thermo-transfer properties could be a suitable frame material for this purpose. The frame material may be formed form any easily malleable and low-cost thermo-transfer capable material to allow for the mass production of frames. The frames could be used with prescription only, sunglass only, or both prescription and sunglass type, and could be used with ophthalmic lenses constructed using the blue light guard medium or with lenses of any kind where thermo-transfer is desirable.

Blue light guard lens material thus allows electrons on thin film layers to absorb the energy of Blue light and transform it into vibrational motion. During vibration, the electrons interact with neighboring atom electrons and convert the vibrational energy into thermal energy. This makes the atoms speed up, collide with other atoms in the material, and then give up that energy as heat from the vibrations. The energy is emitted directly to environment as heat using as a cooling media the frame which surrounds the lenses. Other layers, as above described, enhance digital blue light filtering to reduce overall blue light transmittance to below 35% for rays in the of 440-455 nm range and to only 60% for rays at 460-470 nm.

The proposed ophthalmic lenses employ thin film, nanostructure coatings which have been found to react instantaneously to light. Higher energy areas of the lenses persistently and automatically equalize the brightness levels of these high energy areas across the lens surface while not been affected in areas of low energy. In this way, when looking at, for example, a pc monitor in a dark room, the monitor image projection on the lenses away from the peripheral areas tend to be more active than the peripheral areas. In the darker environment, the lenses will tend to activate fewer photosensitive nanostructure elements, thus providing a dramatically improved contrast perception affect.

Because the proposed lens technology equalizes the light energy differences of light exiting the lens, an unprecedented level of contrast perception and sharpness is achieved.

Ophthalmic Lens Structure

In accordance with an exemplary embodiment, the ophthalmic lens itself consists of three sections: (i) front surface coatings section; (ii) lens material section; and (iii) rear surface coatings section. High vacuum process technology is employed to join these parts in a known manner.

The overall ophthalmic lens, when fully constructed will consist of various overlaid layers of antireflection (AR) material deposed on each of the front and backside of the lens. In a proposed scenario, four AR layers are provided on the front and another four layers on the backside.

Front Surface Coatings Section

The front surface coatings section is comprised of a first set of coatings containing an outermost coating layer consisting of a superslick coat to provide hydrophobic and easy cleaning properties. A second set of coatings, overlays the outermost coating layer, and consists of nine (9) layers of antireflecting materials. This set of coatings was determined to provide excellent and cost-wise optimum optical performance and overall clear appearance. A third set of coatings contains tough, transparent nano-composite coating layers which do not affect optical performance. This third set of coatings provided strong scratch resistance for maximum durability and appearance performance while at the same time providing UV420 protection. A fourth set of coatings consists of multiple, blue light reflecting layers which cooperate to permanently reduce blue light propagation by 35-45% across a range of wavelengths. This fourth set of coatings gives the overall ophthalmic lens structure a light blue tint coloration.

Lens Section

The lens section is a conventional lens section made from 1.61 hi-refractive index plastic resins which provide an overall, light weight, thin and durable result. In a preferred solution, the lens section is equipped with necessary filters to provide 100% UVA and UVB radiation, this UV type radiation being reflected in a known manner.

Rear Surface Coating Section

The rear surface coatings section is comprised of a first system of coatings on the back surface of the lens to provide strong scratch resistant rear surface. A second system of coatings includes a broadband multilayer system with high quality antireflective properties. An outermost five (5) layers of this second coating system are ion-compressed for improved hardness. A third coating system also forms the key aspects of the proposed ophthalmic lens structure with digital blue light maximum protection, as previously described. For this third coating system, nanotechnology fabrication methodologies are employed to form a multi-layer structure of blue light absorption areas of repeating regions of high and low dielectric constants of photonic crystals. This multi-layer structure is disposed between the layers of lens AR-coatings and react only on incident light having a frequency which matches that of harmful digital blue light. These layers of photonic crystals- within the AR Coatings- are positioned so as to allow absorption of an additional 35% of digital blue light, thus exceeding the reduction of digital blue light of the overall ophthalmic lens well beyond the capabilities of commercially available ophthalmic lenses, both prescription and non-prescription type lenses. A fourth system of coatings, further disposed on the rear surface of the ophthalmic lens structure, offers total protection against reflected UVA and UVB radiation, this time from the rear surface of the lens. This total protection for UV is achieved by employing a set of coatings located at the back surface of the ophthalmic lens which prevent light rays from reflecting unfiltered back towards the eye.

Uses and Overall Lens Structure Specifications

As previously explained, every day eye exposure to digital blue light, a relatively new form of high energy light, for which we are not biologically evolved to confront, places a huge toll on human eyes. Blue-violet light can damage our eyes retina and tear glands. The proposed lenses, when worn as eyewear, but conceivably, in other forms, such as screen monitors or covers, provide improved digital blue light protection whenever and wherever it may exist.

An exemplary embodiment of a tested configuration was optimally developed and measured. A listing of representative specifications are provided:

Usage: Optical
Type: Convex Lens
Transmittance: >96%
Shape: Ball, Hemisphere
Material: Resin
Lenses Tint: Light-Blue
Certification: SGS, ISO9001, CE
Coating: Hmc+EMI
Vision Effect: Single Vision
Refractive Index:1.56
Abbe Value: 36
Abrasion Resistance: 6 h~8 h
Coating Color: Blue-Green
Diameter: 72 mm/65 mm
UV Resistance: 420 nm
Gravity: 1.28
RX availability sph/cyl: full range
Certificate: CE, FDA Tested Solutions included prescription lens models with RX availability across full range.

Sunglass versions were also produced and tested and made with tinted mineral (Glass) lenses which offer total protection against UV while totally blocking blue light radiation. Sunglass versions could be of any color, including green-gray, grey and/or brown in color as well as mirror coated, and work as well as non-tinted configurations.

In summary, the proposed ophthalmic lens structure is believed to be superior to conventions digital blue light eyewear due to a high UV420 Protection, ability to prevent UV aging and damaging of patient retinas, full blue light blocking, which implicitly prevents many of the symptoms associated wth DES.

Other benefits include prevention of DES syndrome related symptoms, active contrast perception, true color perception and image sharpness, and UV-antireflection rear surface protection to prevent unfiltered UV rays from reflecting back to one's eyes.

An exemplary embodiment of a tested sunglass configuration was also optimally developed and measured. A listing of representative specifications are provided:

Usage: Sunglasses
Type: Plano Lens
Transmittance: 80%-85%
Shape: Plano
Material: Mineral
Lenses Color: Grey, Brown, Mirror
Certification: ISO9001, CE
Coating: UV420
Diameter: 71 mm, 75 mm
Center thickness: 1.8 mm, 2.00 mm
RX Availability: N/A
Coated: HC Coated, AR Coated, Mirror Coated, Revo Coated Mirror Coating: Blue, Yellow, Gold, Red, Green, White Certificate: CE, FDA As previously explained, the use of frames made from a thermos transfer material with high heat dissipating index allows heat generated from blue light absorption to be easily dissipated else frames might feel warm to the touch and inconvenient to the wearer. For this purpose, the frame material is any suitable plastic polymer material with appropriate molecular structure, so as not to compromise flexibility and durability, yet provide an ultra-lightweight solution with suitable wearer comfort, corrosion resistance, and hypo-allergenic properties, with heat and cold resistance from −30 to 230 degrees Celsius.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An ophthalmic lens consisting of a front surface coating section made of a multi-layer structure that reflects digital blue light, a lens section, and a rear surface coating section made of a multi-layer structure that absorbs digital blue light while allowing higher energy blue light to pass through.

2. The ophthalmic lens of claim 1, wherein the rear surface coating section is formed so as to provide absorption mainly in a central portion of the multi-layer structure from which it is formed.

3. The ophthalmic lens of claim 2, wherein the multi-layer structure of the rear surface coating section comprises a set of coatings made of nanotechnology material forming the associated multi-layer structure, this set of coatings providing blue light absorption areas of repeating regions of high and low dielectric constants of photonic crystals.

4. The ophthalmic lens of claim 3, wherein the multi-layer structure of the rear surface coating section is disposed between layers of lens anti reflective coatings and activated in response to incident light of a frequency that matches that of harmful digital blue light.

5. The ophthalmic lens of claim 4, further comprising a set of coatings disposed on the rear surface of the ophthalmic lens structure for protection against reflected UVA and UVB radiation from the rear surface coating section of the ophthalmic lens to prevent light rays from reflecting unfiltered back towards the eye.

6. The ophthalmic lens of claim 5, wherein the ophthalmic lens has a blue tint coloration.

7. The ophthalmic lens of claim 6, wherein the lens section is a made from 1.61 hi-refractive index plastic resins providing UVA and UVB protection.

8. The ophthalmic lens of claim 2, wherein the lens equalizes the light energy differences of the light exiting from a rear surface of the lens to achieve a desired level of contrast perception and sharpness.

9. The ophthalmic lens of claim 8, wherein the ophthalmic lens has blue tint coloration.

10. The ophthalmic lens of claim 9, wherein the lens section is a made from 1.61 hi-refractive index plastic resins providing UVA and UVB protection.

11. The ophthalmic lens of claim 1, wherein the front surface coating section includes a first set of coatings containing an outermost coating layer consisting of a super-slick coat to provide hydrophobic and easy cleanining properties, a second set of coatings overlayins the outermost coating layer and made of multiple layers of antireflecting materials.

12. The opthalmic lens of claim 11, further comprising a third set of coatings forming the front surface section containing transparent nanocomposite coating layers, and a fourth set of coatings made of multiple, blue light reflecting layers that reduce blue light propagation by 35-45% across a range of wavelengths.

13. The ophthalmic lens of claim 12, wherein the ophthalmic lens has blue tint coloration.

14. The ophthalmic lens of claim 13, wherein the lens section is a made from 1.61 hi-refractive index plastic resins providing UVA and UVB protection.

15. The ophthalmic lens of claim 14, wherein the multi-layer structure of the rear surface coating section is disposed between layers of lens anti reflective coatings and activated in response to incident light of a frequency that matches that of harmful digital blue light.

16. The ophthalmic lens of claim 13, further comprising a third set of coatings made of nanotechnology material forming the associated multi-layer structure, the third set of coatings providing blue light absorption areas of repeating regions of high and low dielectric constants of photonic crystals.

17. The ophthalmic lens of claim 13, further comprising a fourth set of coatings disposed on the rear surface of the ophthalmic lens structure for protection against reflected UVA and UVB radiation from the rear surface coating section of the ophthalmic lens to prevent light rays from reflecting unfiltered back towards the eye.

18. The ophthalmic lens of claim 1, wherein the rear surface coating section includes a first set of coatings on the back surface of the lens to provide strong scratch resistant rear surface, a second system of coatings comprised of a broadband multilayer system with high quality antireflective properties and hardness.

19. A frame for spectacle lenses made of thermo transfer material, wherein the frame is configured for use with an ophthalmic lens consisting of a front surface coating section made of a multi-layer structure that reflects digital blue light, a lens section, and a rear surface coating section made of a multi-layer structure that absorbs digital blue light while allowing higher energy blue light to pass through.

20. The frame of claim 19, wherein absorbed digital light is transferred in the form of heat by the frame.

\* \* \* \* \*